(12) United States Patent
Yokoh et al.

(10) Patent No.: US 7,741,232 B2
(45) Date of Patent: Jun. 22, 2010

(54) ELECTRON-EMITTING WOVEN FABRIC AND DISPLAY DEVICE USING SAME

(75) Inventors: Kuniyoshi Yokoh, Sendai (JP); Kenji Omote, Sendai (JP)

(73) Assignee: Ideal Star Inc., Sendai-Shi (JP)

( * ) Notice: Subject to any disclaimer, the term of this patent is extended or adjusted under 35 U.S.C. 154(b) by 1069 days.

(21) Appl. No.: 10/562,835

(22) PCT Filed: Jun. 30, 2004

(86) PCT No.: PCT/JP2004/009189

§ 371 (c)(1),
(2), (4) Date: May 19, 2006

(87) PCT Pub. No.: WO2005/001180

PCT Pub. Date: Jan. 6, 2005

(65) Prior Publication Data

US 2007/0117488 A1    May 24, 2007

(30) Foreign Application Priority Data

Jun. 30, 2003    (JP) .............................. 2003-189083

(51) Int. Cl.
*D03D 15/00* (2006.01)
*D03D 9/00* (2006.01)

(52) U.S. Cl. ................... 442/21; 442/2; 442/4; 442/20; 442/181; 977/932; 977/939; 977/952; 977/734

(58) Field of Classification Search ............... 442/2, 442/4, 20, 21, 181; 977/932, 939, 952, 734–753
See application file for complete search history.

(56) References Cited

U.S. PATENT DOCUMENTS 5,838,118 A * 11/1998 Kochanski et al. .......... 315/326

(Continued)

FOREIGN PATENT DOCUMENTS

JP    4-009688    1/1992

(Continued)

OTHER PUBLICATIONS

Tomohiko et al., "Growth of AE(=Ca,Ba)$F_2$ and RE(=Pr,Ce)$F_3$ crystals by Micro-Pulling-down Method", vol. 48, pp. 35-36.

*Primary Examiner*—D. Lawrence Tarazano
*Assistant Examiner*—Matthew D Matzek
(74) *Attorney, Agent, or Firm*—Young & Thompson

(57) ABSTRACT

An electron-emitting woven fabric according to the present invention is intended to provide an electron emission source that can be produced extremely easily, readily shaped to have a large area, and used for a wide variety of applications including a display device. The electron-emitting woven fabric according to the present invention is characterized in that first linear bodies 3 composed of a conductive layer 1 and an insulating layer 2 covering the conductive layer 1 and second linear bodies 4 of a conductive material are crossed. Another mode of the electron-emitting woven fabric according to the present invention is characterized in that a carbonaceous material is provided on a surface of each of crossed parts of the second linear bodies crossing the first linear bodies at lifted portions and/or sunk portions of the first linear bodies.

5 Claims, 3 Drawing Sheets

U.S. PATENT DOCUMENTS

2003/0133865 A1 * 7/2003 Smalley et al. ............ 423/447.1
2006/0047052 A1 * 3/2006 Barrera et al. .............. 524/495

FOREIGN PATENT DOCUMENTS

| | | |
|---|---|---|
| JP | 5-087934 | 4/1993 |
| JP | 11-302936 | 11/1999 |
| JP | 2000-100358 | 4/2000 |
| JP | 2000-106101 | 4/2000 |
| JP | 2000-151182 | 5/2000 |
| JP | 2000-173446 | 6/2000 |
| JP | 2002-350597 | 12/2002 |
| JP | 2003-107160 | 4/2003 |
| WO | WO 0192381 A1 * | 12/2001 |

* cited by examiner

2) EMISSION CONFIRMING METHOD

WOVEN FABRIC WAS ARRANGED IN VACUUM CHAMBER AS SHOWN IN DRAWING IN ORDER TO CONFIRM ELECTRON EMISSION DIRECT-CURRENT VOLTAGES OF $V_0 = 2000$ V AND $V_1 = 100$ V WERE APPLIED TO OBSERVE LIGHT EMISSION OF FLUORESCENT SUBSTANCE

ELECTRON-EMITTING WOVEN FABRIC AND DISPLAY DEVICE USING SAME

TECHNICAL FIELD

The present invention relates to an electron-emitting woven fabric and a display device using the same.

BACKGROUND ART

As a field emission type cold cathode electron source (which will be referred to as an "electron source" hereinafter), there is a so-called spint type electron source or a so-called planar multi-layered type electron source having a configuration in which a lower electrode, a metal or a semiconductor thin film, an insulating layer, and an upper electrode are sequentially superimposed.

The former spint type electron source has a lower electrode in which many small conical tips (emitters) usually formed of molybdenum are arranged, an upper electrode in which hole portions from which end portions of the tips are exposed are arranged, and an insulating portion formed between the lower electrode and the upper electrode. The spint type electron source is configured to emit electrons through the hole portions by applying a positive voltage to the upper electrode with respect to the lower electrode. This spint type electron source is an electron source that currently has the highest percentage of completion.

Patent Reference 1: Japanese Patent Application Laid-open No. 2000-106101
Patent Reference 2: Japanese Patent Application Laid-open No. 2000-100358

However, as to the spint type electron source, since the electron source including the small conical tips is formed by a fine processing technology, its manufacturing process is complicated, and the spint type electron source is hard to be formed to have a large area and has an inconvenience that its manufacturing cost is very high.

Further, the planar multi-layered type electron source can be readily manufactured as compared with the spint type electron source, but it requires various kinds of lamination processes, and it cannot be necessarily easily manufactured.

DISCLOSURE OF THE INVENTION

Problems to be Solved by the Invention

It is a first object of the present invention to provide an electron emission source that can be very easily manufactured and readily formed to have a large area. Furthermore, it is a second object of the present invention to provide a display device that has a high resolution and a high luminance but does not have irregularities in luminance depending on pixels and is superior in stability of such characteristics.

Means for Solving Problems

The present invention (1) provides an electron-emitting woven fabric comprising: first linear bodies composed of a conductive layer covered with an insulating layer; and second linear bodies formed of a conductive material, the first linear bodies and the second linear bodies being crossed.

The present invention (2) provides the electron-emitting woven fabric according to the invention (1), WHEREIN a carbonaceous material is provided on a surface of each of cross parts of the second linear bodies crossing the first linear bodies at lifted portions and/or sunk portions of the first linear bodies.

The present invention (3) provides the electron-emitting woven fabric according to the invention (2), wherein the carbonaceous material is one or more selected from a group consisting of a carbon nanotube, diamond-like carbon and fullerenes.

The present invention (4) provides the electron-emitting woven fabric according to one of the inventions (1) to (3), wherein the conductive layer comprises a conductive polymer.

The present invention (5) provides the electron-emitting woven fabric according to the invention (4), wherein fullerenes are added in the conductive polymer.

The present invention (6) provides the electron-emitting woven fabric according to one of the inventions (1) to (5), wherein a diameter of each of the first linear body and the second linear body is not greater than 1 mm.

The present invention (7) provides the electron-emitting woven fabric according to the invention (6), wherein the diameter of the second linear body is not greater than ½ of the diameter of the first linear body.

The present invention (8) provides a display device comprising: an electron-emitting woven fabric according to one of the inventions (1) to (7); and a light-emitting portion provided to face an electron-emitting direction of the woven fabric.

EFFECTS OF THE INVENTION

The electron-emitting woven fabric according to the present invention can be very easily manufactured, readily formed to have a large area and used for various applications including a display device.

Figure 1:
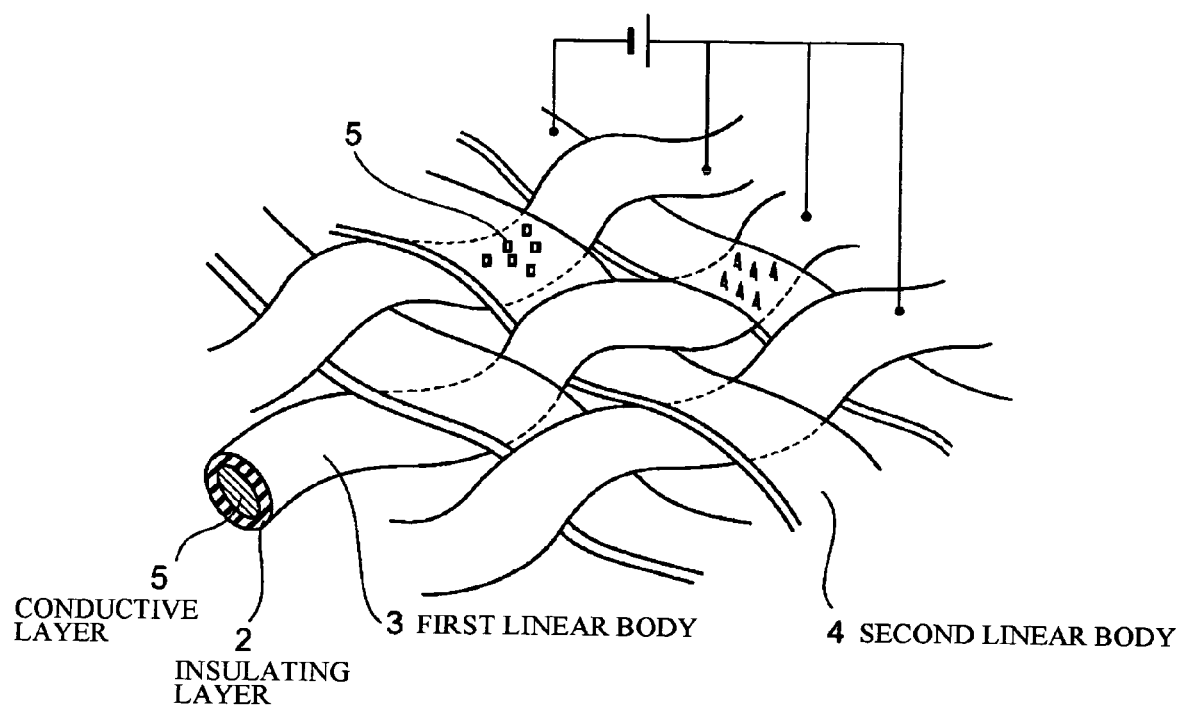
FIG. 1 is a perspective view of an outer surface showing an example of an electron-emitting woven fabric according to the present invention.

DESCRIPTION OF REFERENCE NUMERALS 1 conductive layer
2 insulating layer
3, 3a, 3b, 3c first linear bodies
4, 4x, 4y, 4z second linear bodies
5 carbonaceous material

BEST MODE FOR CARRYING OUT THE INVENTION

An electron-emitting woven fabric according to the present invention has a configuration in which first linear bodies having a conductive layer covered with an insulating layer and second linear bodies formed of a conductive material are crossed. First, a description will be given as to the first linear bodies and the second linear bodies constituting the woven fabric.

A conductive material constituting the "conductive layer" concerning the first linear bodies is not specifically restricted as long as it is conductive, and there are, e.g., a metal (e.g., a copper wire), a conductive inorganic material, and a conductive organic material (e.g., a conductive polymer material), (e.g., a carbonaceous fabric), and a non-conductive material may be contained as long as conductivity is not deteriorated.

Here, as the conductive material, a conductive polymer is preferable in light of easiness of woven fabric formation. For example, there are polyacetylene, polyp-phenylenevinylene, polypyrrole, poly-3-alkylthiophen and polyaniline.

Moreover, in light of improving electron emission efficiency, fullerenes may be added in the conductive polymer. Here, the "fullerenes" means an empty fullerene, (e.g., C60), an empty hetero-fullerene and a fullerene including these materials. Here, as an internal atom of the fullerene including such materials, it is possible to appropriately select an alkali metal, any other metals (e.g., Li, Na, K, La), hydrogen, nitrogen, argon, any other gaseous atoms, fluorine, chlorine and any other halogen atoms. In particular, the fullerene including a metal atom is preferable since electrons are apt to exist outside the fullerene, thereby improving the electron emission efficiency.

It is to be noted that when the material-including fullerene reacts with moisture in atmospheric air, it has an OH group outside thereof, and it thereby becomes electrically neutral in some cases. Thus, in order to further improve the electron emission efficiency, it is preferable to use a fullerene from which an external modification group such as an OH group has been removed. For example, in case of a metal-including fullerene, it couples with oxygen during or after a manufacturing process so that an OH group is apt to be externally modified. Therefore, it is preferable to use a metal-including fullerene having no external modification group obtained by being maintained in an atmosphere where coupling with oxygen does not occur during a manufacturing process.

Next, an insulating material of the "insulating layer" concerning the first linear body is not particularly restricted as long as it electrically has insulating properties, and there is, e.g., an inorganic material such as alumina or silicon dioxide, or an insulating polymer such as polyethylene. It is preferable to use an insulating polymer in terms of a fact that extrusion is possible or a fact that flexibility is provided even though a diameter is large.

In regard to a diameter of the first linear body when used in a display device, a narrower fabric is preferable for realization of a high resolution/a high luminance, elimination of irregularities in luminance depending on pixels, an improvement in stability of such characteristics and others. For example, a diameter that is not greater than 1 mm is preferable, and a diameter of 0.1 µm to 1 mm is more preferable. Additionally, a thickness of the "insulating layer" in the first linear body is, e.g., 0.1 to 10 µm. Further, a cross-sectional shape of the first linear body is not restricted to a specific shape, it is possible to use a triangular shape, a square shape, a rectangular shape, any other polygonal shapes, a circular shape and an elliptic shape, and the circular shape is preferable in light of moldability.

Next, a "conductive material" concerning the second linear body is not restricted to a specific material as long as it has conductive properties, there are, e.g., a metal, a conductive inorganic material, and a conductive organic material (e.g., a conductive polymer material), and a non-conductive material may be contained as long as conductive properties are not deteriorated. Therefore, it may be the same as the conductive material constituting the first conductive layer.

Figure 3:
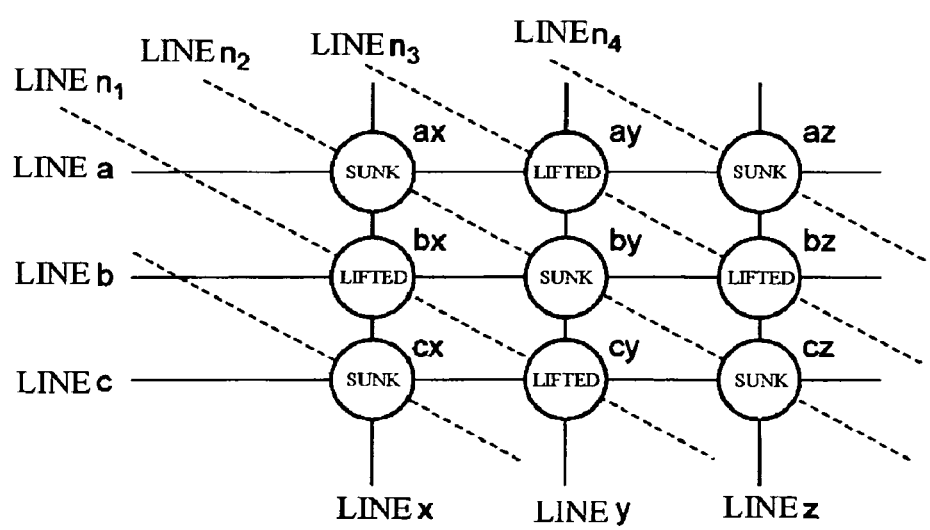
FIG. 3 is a plan view showing cross parts of the woven fabric in the electron-emitting woven fabric according to the present invention.

Here, it is preferable to provide a carbonaceous material on a surface of each of cross parts (e.g., parts ax, by and cz which function as sunk portions of the first linear bodies in FIG. 3) of the second linear bodies crossing the first linear bodies.

Figure 2:
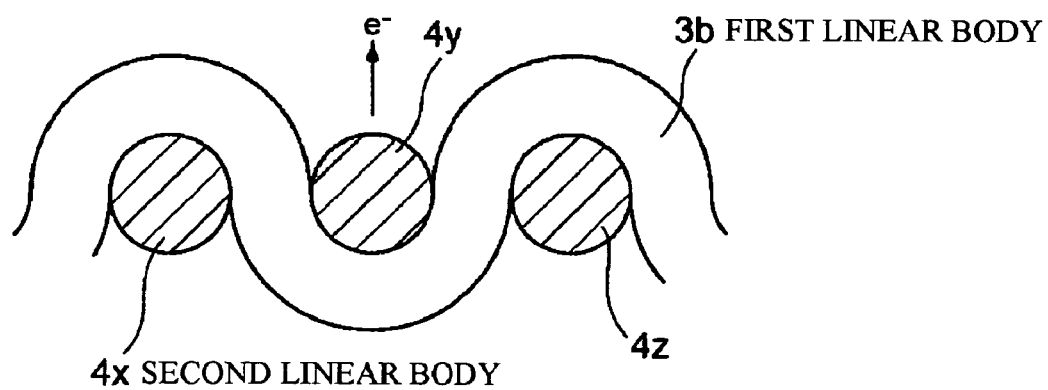
FIG. 2 is a cross-sectional view showing a crossing state of a first linear body and second linear bodies in the electron-emitting woven fabric according to the present invention.

Incidentally, when a carbonaceous material is provided at the cross parts, it must be provided on at least an electron-emitting surface (e.g., an upper surface of 4y in FIG. 2). Furthermore, it is preferable to roughen the surface by using the carbonaceous material (e.g., a symbol "open square" or "A" in FIG. 1 shows a state in which the carbonaceous material protrudes from the surface). When such a configuration is adopted, concentration of an electric field is increased at lifted portions and/or sunk portions, and a quantity of electrons emitted from the lifted portions and/or the sunk portions is increased. It is to be noted that a position where the carbonaceous material is provided is not necessarily restricted to the surface of each cross part, and it may be provided on the entire surface of the second linear bodies. Here, as a preferable carbonaceous material, there are a carbon nanotube, diamond-like carbon, and fullerenes, and a material-including fullerene is particularly preferable since it can considerably reduce a drive voltage. It is to be noted that a meaning of the "fullerenes" is as described in conjunction with the first linear bodies.

A diameter or a cross-sectional shape of the second linear body is not specifically restricted, and it may be the same diameter/shape as the first linear body. However, as to the diameter of the second linear body when used in a display device, like the first linear body, a narrower fabric is preferable for realization of a high resolution/a high luminance, elimination of irregularities in luminance depending on pixels, an improvement in stability of such characteristics and others. For example, a diameter that is not greater than 1 mm is preferable, and 0.1 µm to 1 mm is more preferable. Adopting a diameter smaller than that of the first linear body is more preferable.

It is preferable to set a diameter ($d_2$) of the second linear body to ½ or below of a diameter ($d_1$) of the first linear body. When this diameter is set to ½ or below, both types of linear bodies can be easily beautifully woven, and dimensions of the respective lifted portions and sunk portions in the woven fabric are uniformed. Furthermore, electron emission properties are considerably improved. Incidentally, setting ($d_2$)/($d_1$) to ⅓ or below is more preferable.

The electron-emitting woven fabric according to the present invention will now be described in detail. First, the "woven fabric" is a concept including a textile or a knitted work, and has a structure in which longitudinal threads and latitudinal threads are crossed and lifted and sunk portions (convex and concave portions) are provided at their cross parts. That is, the sunk portions and the lifted portions at the cross parts. As weaves, there are, e.g., a plain weave, a twill weave, a satin weave, a ribbed fabric weave, a honey-comb weave, a crepe weave and a mock leno. When such a configuration is adopted, separating movement of the linear bodies is prevented, thereby forming a planar configuration.

FIGS. 1 to 3 show a concrete example. As shown in FIG. 1, this woven fabric has a configuration in which first linear bodies 3 having a conductive layer 1 covered with an insulating layer 2 and second linear bodies 4 formed of a conductive material are crossed. Here, as shown in FIG. 2, the first linear body 3b forms a lifted portion (a cross part with respect to 4x), a sunk portion (a cross part with respect to 4y) and a lifted portion (a cross part with respect to 4z) at cross parts with respect to the second linear bodies 4, thereby generating an electron at the sunk portion as shown in the drawing. Moreover, as shown in FIG. 3, when the second linear bodies 4x, 4y and 4z are arranged on the same plane and the first linear body 3b is woven, a sunk portion ax, a lifted portion ay and a sunk portion az are formed along a line a, a lifted portion bx, a sunk portion by and a lifted portion bz are formed along a line b, and a sunk portion cx, a lifted portion cy and a sunk portion cz are formed along a line c. That is, the sunk portion by is surrounded by the four lifted portions ay, bx, bz and cy. It is to be noted that third linear bodies formed of a conductive material may be obliquely woven between the first linear bodies and the second linear bodies as indicated by dotted lines in FIG. 3, thereby emitting electrons from each dot in a matrix.

A manufacturing method of the electron-emitting woven fabric according to the present invention will now be described. First, the first linear body can be obtained by integrally molding the conductive layer and the insulating layer based on extrusion or by forming the insulating layer on the conductive layer based on sputtering, chemical vapor deposition, dipping or the like.

The second linear body can be manufactured by, e.g., extrusion. Here, in case of forming the carbonaceous material on the second linear body, it is preferable to form a layer consisting of Fe, Ni, Co or an alloy including two or more of these materials at least on a part of the second linear body where the carbonaceous material is formed. When such a layer is formed in advance, formation of the carbonaceous material on the surface can be facilitated. It is to be noted that the second linear body itself may be formed of such a material.

Manufacture of the woven fabric from the first linear bodies and the second linear bodies can be readily achieved by using, e.g., a general-purpose weaving loom.

A using method of the electron-emitting woven fabric according to the present invention will now be described with reference to FIGS. 1 and 3. In the example shown in FIG. 1, when each second linear body is in a negative state and a positive voltage is applied to the conductive layer of each first linear body, an electron e is emitted from the sunk portion b2. Further, in the example shown in FIG. 3, when a voltage is applied in such a manner that the line a, the line b and the line c become positive and the line y becomes negative, an electron is emitted from the sunk portion by.

The woven fabric having such characteristics can be utilized for various kinds of applications. For example, when it is used for a display device, the display device can be configured to include the woven fabric and a light-emitting portion provided to face an electron emission direction of the woven fabric. It is to be noted that, when the light-emitting portions are provided on both surfaces of the woven fabric, a double-faced display can be provided. Furthermore, it can be utilized as an electron tube display device.

EMBODIMENT

Manufacturing Example 1

(1) Manufacture of First Linear Body

First, the conductive layer was manufactured in accordance with the following procedure. A polypyrrole aqueous solution (5 wt % aqueous solution; manufactured by Aldrich Corporation; 48, 255-2) was prepared, and it was then subjected to vacuum drying while being put in a beaker, thereby obtaining a film-shaped solid substance. This film-shaped solid substance was cut into a size of several mm to obtain a fabric shape by a melt extruder (manufactured by Imoto Seisakusho). A diameter of the fabric after fiber forming was approximately 0.5 mm.

Then, the insulating layer was formed on the conducive layer in accordance with the following procedure. The above-described fabric was cut out with a length of 10 cm, and set in a deposition apparatus capable of rotating a sample. Subsequently, silicon dioxide was deposited with a thickness of 0.2 μm while rotating the fabric.

(2) Manufacture of Second Linear Body

An iron wire (a diameter: 0.2 mm) was soaked in a dimethylformamide solution (0.2 weight %) of a lithium-including C60 fullerene (manufactured based on a method described in "J. Phys. Chem. Solids Vol 58, No. 11, pp. 1763-1769, 1997; Production and LDMS Characterization of Endohedral Alkali-Fullerene Films; Author E. E. B. Champbell et al."), and then dried, thereby obtaining the second linear body.

(3) Manufacture of Electron-emitting Woven Fabric

The subject woven fabric was obtained by plain-weaving the 10 first linear bodies and the 10 second linear bodies by hand.

Manufacturing Example 2

(1) Manufacture of First Linear Body

First, the conductive layer was manufactured in accordance with the following procedure. A polypyrrole aqueous solution (5 wt % aqueous solution; manufactured by Aldrich Corporation; 48,255-2) was prepared, a lithium-including C60 fullerene was added to polypyrrole with a ratio of 10 weight %, and the thus obtained material was then subjected to vacuum drying while being put in a beaker, thereby obtaining a film-shaped solid substance. This film-shaped solid substance was cut into a size of several mm to be formed into a fabric shape by a melt extruder (manufactured by Imoto Seisakusho). A diameter of the fabric after fiber forming was approximately 0.5 mm.

Then, the insulating layer was formed on the conductive layer in accordance with the following procedure. The fabric was cut out with a length of 10 cm, and set in a deposition apparatus capable of rotating a sample. Subsequently, silicon dioxide was deposited with a thickness of 0.2 μm while rotating the fabric.

(2) Manufacture of Second Linear Body

An iron wire (a diameter: 0.2 mm) was soaked in a dimethylformamide solution (0.2 weight %) of a lithium-including C60 fullerene and then dried, thereby obtaining the second linear body.

(3) Manufacture of Electron-emitting Woven Fabric

The subject woven fabric was obtained by plain-weaving the 10 first linear bodies and the 10 second linear bodies by hand.

Electron Emission Confirming Test

Figure 4:
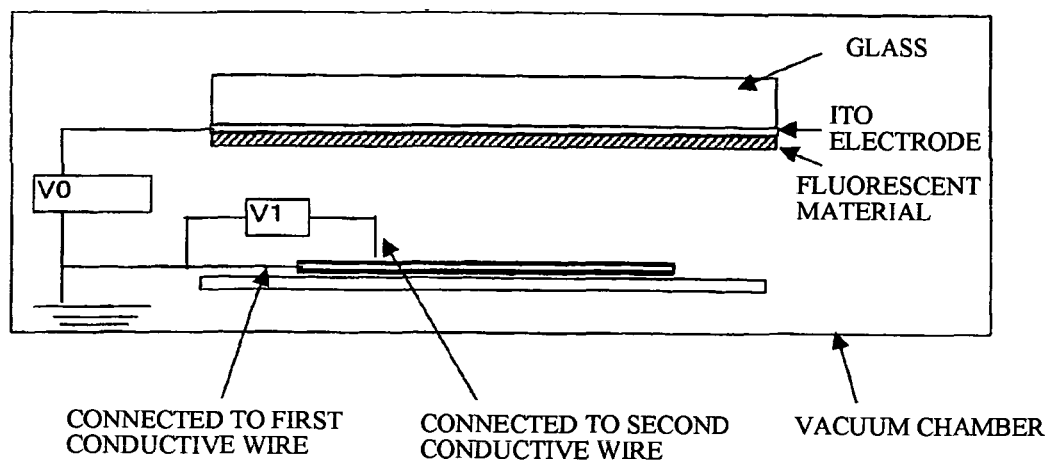
FIG. 4 is a structural view of an electron emission confirming test in the embodiment.

In order to confirm electron emission performance of the electron-emitting woven fabrics according to Manufacturing Examples 1 and 2, each of the woven fabric was arranged in a vacuum chamber as shown in FIG. 4. Direct-current voltages of $V_0=2000$ V and $V_1=100$ V were applied to observe light emission of each fluorescent material. As a result, both examples using the fabrics demonstrated excellent light emission. In particular, it was confirmed that Manufacturing Example 2 has excellent electron emission performance.

INDUSTRIAL APPLICABILITY

The electron-emitting woven fabric according to the present invention can be very easily manufactured, readily shaped to have a large area, and utilized for various kinds of applications including a display device.

The invention claimed is:

1. An electron-emitting woven fabric comprising:

first linear bodies having a conductive layer covered with an insulating layer; and second linear bodies formed of a conductive material and crossing the first linear bodies to form cross parts, wherein the conductive layer comprises a conductive polymer, a carbonaceous material is provided on a surface of the second linear bodies of the cross parts, the carbonaceous material is one or more selected from a group consisting of carbon nanotubes and fullerenes, and electrons are emitted from the cross parts of the first linear bodies and the second linear bodies.

2. The electron-emitting woven fabric according to claim 1, wherein the fullerenes are added in the conductive polymer.

3. The electron-emitting woven fabric according to claim 1, wherein a diameter of each of the first linear body and the second linear body is not greater than 1 mm.

4. The electron-emitting woven fabric according to claim 3, wherein the diameter of the second linear body is one-half or less than that of the diameter of the first linear body.

5. A display device comprising:

an electron-emitting woven fabric as defined in claim 1; and a light-emitting portion provided to face an electron-emitting direction of the woven fabric.

* * * * *